United States Patent [19]

Hinchcliffe et al.

[11] Patent Number: 4,860,880
[45] Date of Patent: Aug. 29, 1989

[54] CONVEYOR SYSTEM FOR ROD-LIKE ARTICLES

[75] Inventors: Dennis Hinchcliffe, Deptford; William A. Stone, New Eltham, both of United Kingdom

[73] Assignee: Molins Limited, London, United Kingdom

[21] Appl. No.: 648,262

[22] Filed: Sep. 7, 1984

Related U.S. Application Data

[63] Continuation of Ser. No. 571,943, Jan. 19, 1984, abandoned, which is a continuation of Ser. No. 151,983, May 21, 1980, abandoned.

[30] Foreign Application Priority Data

May 22, 1979 [GB] United Kingdom ................ 7917751

[51] Int. Cl.⁴ ............................................. B65G 47/24
[52] U.S. Cl. .................................... 198/405; 198/951
[58] Field of Search .............. 198/405, 410, 408, 406, 198/347, 450, 457, 417, 628, 951, 575, 402-404

[56] References Cited

U.S. PATENT DOCUMENTS

| | | | |
|---|---|---|---|
| 2,929,489 | 3/1960 | Parrish | 198/405 |
| 3,262,545 | 7/1966 | Worsencroft | 198/628 |
| 3,767,028 | 10/1973 | Rosso | 198/405 |
| 3,870,143 | 3/1975 | Heybourn et al. | 198/406 |
| 4,042,112 | 8/1977 | Molins et al. | 198/417 |
| 4,120,391 | 10/1978 | Molins et al. | 198/347 |
| 4,200,181 | 4/1980 | Clarke | 198/575 |
| 4,280,611 | 7/1981 | Molins et al. | 198/347 |

FOREIGN PATENT DOCUMENTS

| | | | |
|---|---|---|---|
| 1091019 | 10/1960 | Fed. Rep. of Germany | 198/951 |
| 818684 | 8/1959 | United Kingdom | 198/405 |

Primary Examiner—Joseph E. Valenza
Attorney, Agent, or Firm—Antonelli, Terry & Wands

[57] ABSTRACT

A conveyor system for rod-like articles, particularly cigarettes, includes a transfer conveyor comprising twisting endless bands arranged to convey a multiple-layer stream of articles in a direction transverse to the lengths of the articles and to twist the stream about an axis generally parallel to the conveyance direction. Also disclosed is a conveyor system in which at least one stream of substantially horizontal rod-like articles is twisted and conveyed to a junction beyond which a mutltiple-layer stream of substantially vertical articles is conveyed. The conveyor systems are particularly useful for "tip turning" filter cigarettes so that a stream on a first conveyor may be combined with a parallel stream on a second conveyor after being twisted and laterally displaced by the transfer conveyor so that the filter tip ends of both streams are on the same side.

37 Claims, 3 Drawing Sheets

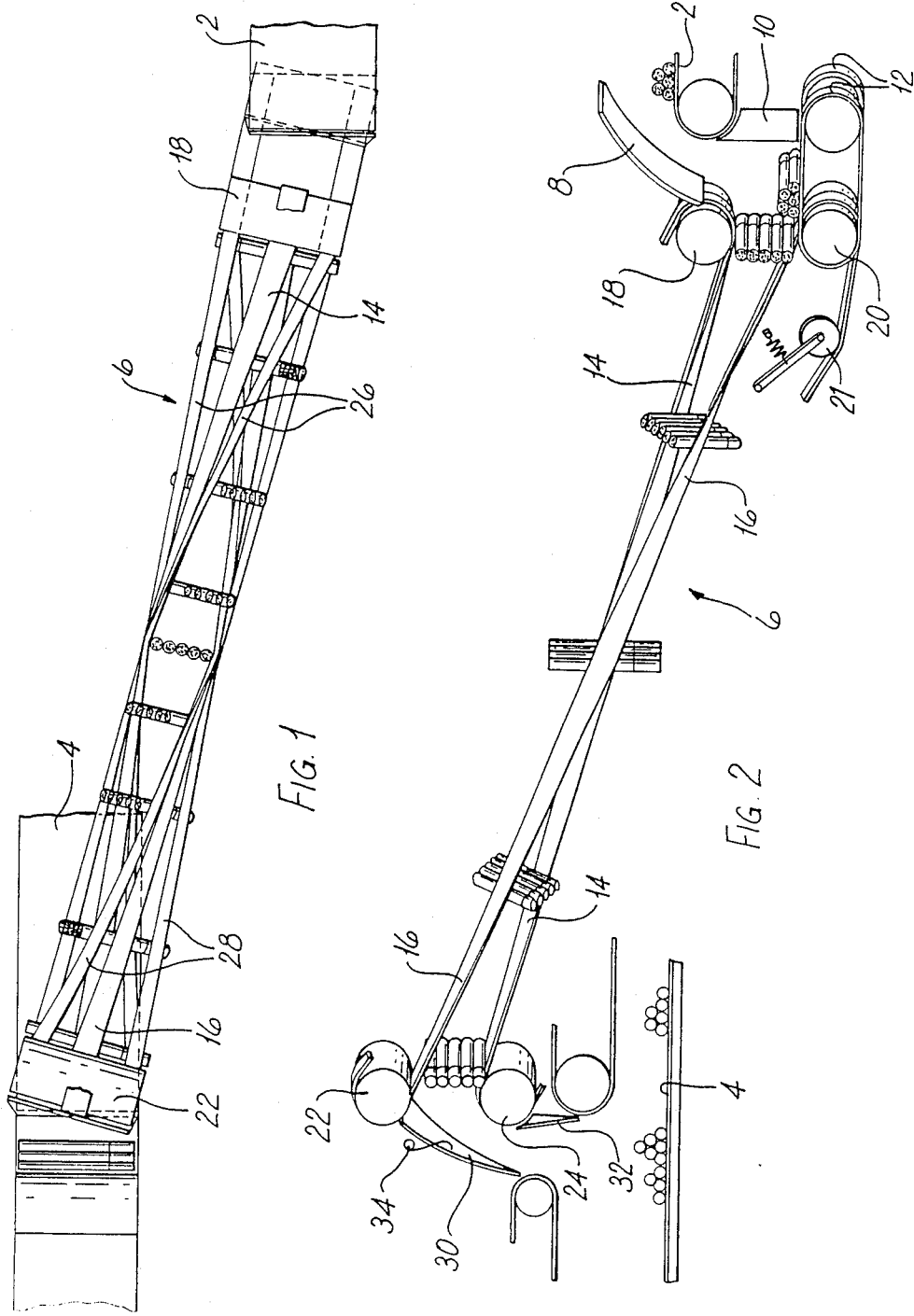

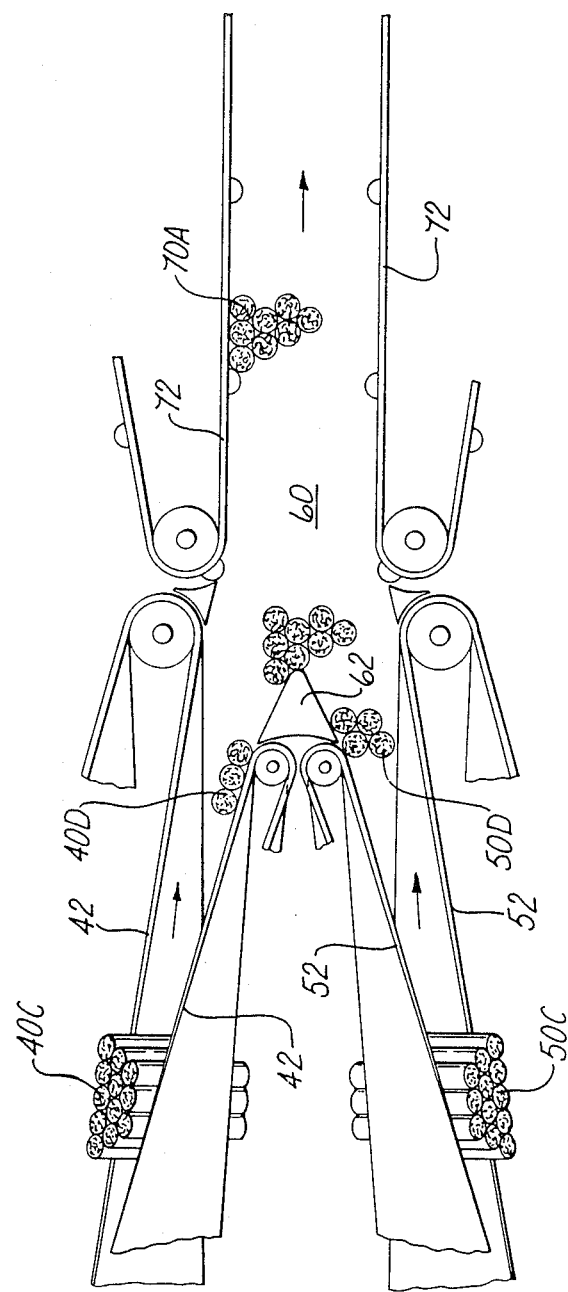

CONVEYOR SYSTEM FOR ROD-LIKE ARTICLES

This application is a continuation of SN 06/571,943 filed Jan. 19, 1984, now abandoned, which was a continuation of SN 06/151,983 filed May 21, 1980 now abandoned.

This invention relates to conveyor systems for rod-like articles, particularly cigarettes or other similar articles of the tobacco industry.

A common form of filter cigarette making machine produces two parallel streams of filter cigarettes with the filter tips facing in opposite directions in relation to the direction of travel of the respective stream. Therefore, before the streams can be combined, the cigarettes in one stream are normally turned so that their filter tips face in the same direction as those of the other stream. This process is known as "tip turning". The conveyor system of the present invention is particularly, but not exclusively, useful for "tip turning".

According to one aspect of the present invention a conveyor system for rod-like articles comprises first conveyor means for conveying articles in a direction transverse to their lengths, transfer conveyor means for conveying a continuous stream of articles in stack formation from said first conveyor means, a junction zone to which articles are delivered by said transfer conveyor means, and second conveyor means for moving articles away from said junction zone, said transfer conveyor means comprising spaced conveyors defining a path for said stream and arranged to twist said stream about an axis substantially parallel to its direction of conveyance. The path defined by the transfer conveyor means may be horizontal or inclined, upwards or downwards, and could be vertical.

The transfer conveyor means may comprise spaced bands which are held under tension so that they grip opposite sides of the stream. The bands on each side of the stream may be separate endless bands or runs of a single continuous endless band, passing around spaced rollers at the ends of the transfer conveyor means. Thus a lower conveyor band at an upstream part of the transfer conveyor means may become an upper conveying band adjacent the junction zone, and vice versa, thereby providing a 180° twist in the path on said conveyor means. Additional guides which follow the bands may be provided for the sides and/or ends of the articles in the stream.

The second conveyor means is preferably arranged to convey the articles in stack formation. The junction zone may be supplied with articles from an input conveyor other than said transfer conveyor means, which input conveyor may be an upstream part of the second conveyor means.

The first and second conveyor means are preferably parallel endless conveyors for carrying continuous stacks of rod-like articles. The transfer to the transfer conveyor means and the junction zone may each include a relatively small change in lateral conveying direction so that the transfer conveyor means extends diagonally between the first and second conveyor means. The angle of the change of direction may conveniently be up to about 15°. Where the transfer conveyor means is inclined a chute or downdrop for articles may conveniently be provided at each end of the transfer conveyor means so that the latter extends from a region just below the first conveyor means to a region just above the second conveyor means.

Sensor means may be provided adjacent the upstream part of the transfer conveyor means, and may be used to control the first conveyor means, possibly to form a stack from a single row stream on the first conveyor means. Sensor means may also be provided in the junction zone to control the transfer conveyor means.

According to another aspect of the present invention a conveyor system for rod-like articles comprises means for conveying a first stream of rod-like articles in a direction transverse to the lengths of the articles, means for conveying a second stream of rod-like articles in a direction transverse to the lengths of the articles, means for twisting articles in at least one stream about a generally horizontal (as herein defined) axis transverse to the lengths of the articles, and means for combining said streams, including a junction zone in which articles from both streams are parallel. In a preferred arrangement each stream is twisted through about 90° so that articles in the stream are initially substantially horizontal and finally substantially vertical.

Preferably a common stream is formed in the junction zone, preferably with the articles substantially vertical. The common stream may itself be twisted through 90°, e.g. so that the articles become horizontal once again.

The two streams may comprise single rows of articles or may comprise multiple-layer stacks of articles. The common stream preferably comprises a multiple-layer stream of articles. Thus a moving stack of substantially vertical articles may be formed from two single layer streams of substantially horizontal articles.

The two streams may consist of filter cigarettes issuing from a conventional filter cigarette assembling machine. The streams have the filter tipped ends of the cigarettes adjacent each other, i.e. the streams have the filter tips on opposite sides relative to their directions of movement. The cigarette streams may be twisted in opposite directions so that the filter tip ends of each stream are lowered until streams of substantially vertical cigarettes with the filter tips lowermost are formed. Preferably the streams are combined or merged in this attitude; this helps to prevent tobacco loss. The combined stream may then be twisted back to form a conventional horizontal stream which may be fed to further processing equipment, e.g. a tray filler or cigarette packing machine. Alternatively the combined stream may remain with the cigarettes vertical; this can be useful if it is required to turn the stream around a curve in a horizontal plane.

The streams may be conveyed by twisting bands in a manner similar to that referred to above in connection with the first aspect of the present invention. Similarly the combined stream may be conveyed by such twisting bands. Alternatively, twisting guides could be used, preferably of low friction material, so that conveyance of the stream over or through the guides could be achieved by upstream and/or downstream driven conveyors and/or gravity. For example, parallel substantially horizontal streams could be conveyed over polished guide surfaces which twist through 90° in opposite directions to allow the respective inner ends of the articles on the streams to fall downwards and merge. More elaborate twisting guide means could be provided, similar to that disclosed in British Patent Specification No. 1430061, for example.

The paths which the two streams and common stream follow need not be horizontal and can be inclined. In particular where guide surfaces are used for part of the paths followed by the streams it is preferable that these paths should be downwardly inclined. In this respect it should be noted that the term "generally horizontal" as used in connection with the present invention is intended to include upwardly or downwardly inclined axes, up to about 45° for example.

According to another aspect of the invention a conveyor system for rod-like articles comprises means for conveying at least one stream of substantially horizontal rod-like articles, means for twisting said stream about an axis transverse to the articles, and means for subsequently conveying the stream with the articles substantially vertical. Preferably the conveying directions of said streams are generally horizontal (as herein defined). The conveyance speed of the stream of vertical articles may be different from that of the stream of horizontal articles, so that the heights of the streams may be different. For example, the stream of horizontal articles may be a single layer stream whereas the stream of vertical articles may comprise a multiple-layer stack. Two to more streams of substantially horizontal articles may be twisted and combined into a single stream of vertical articles in a common merger zone.

The invention will be further described, by way of example only, with particular reference to the accompanying diagrammatic drawings, in which:

FIG. 1 is a plan view of a conveyor system for cigarettes;

FIG. 2 is a side view of the conveyor system of FIG. 1;

FIG. 4 is a plan view of part of the conveyor system of FIG. 3.

Figure 3:
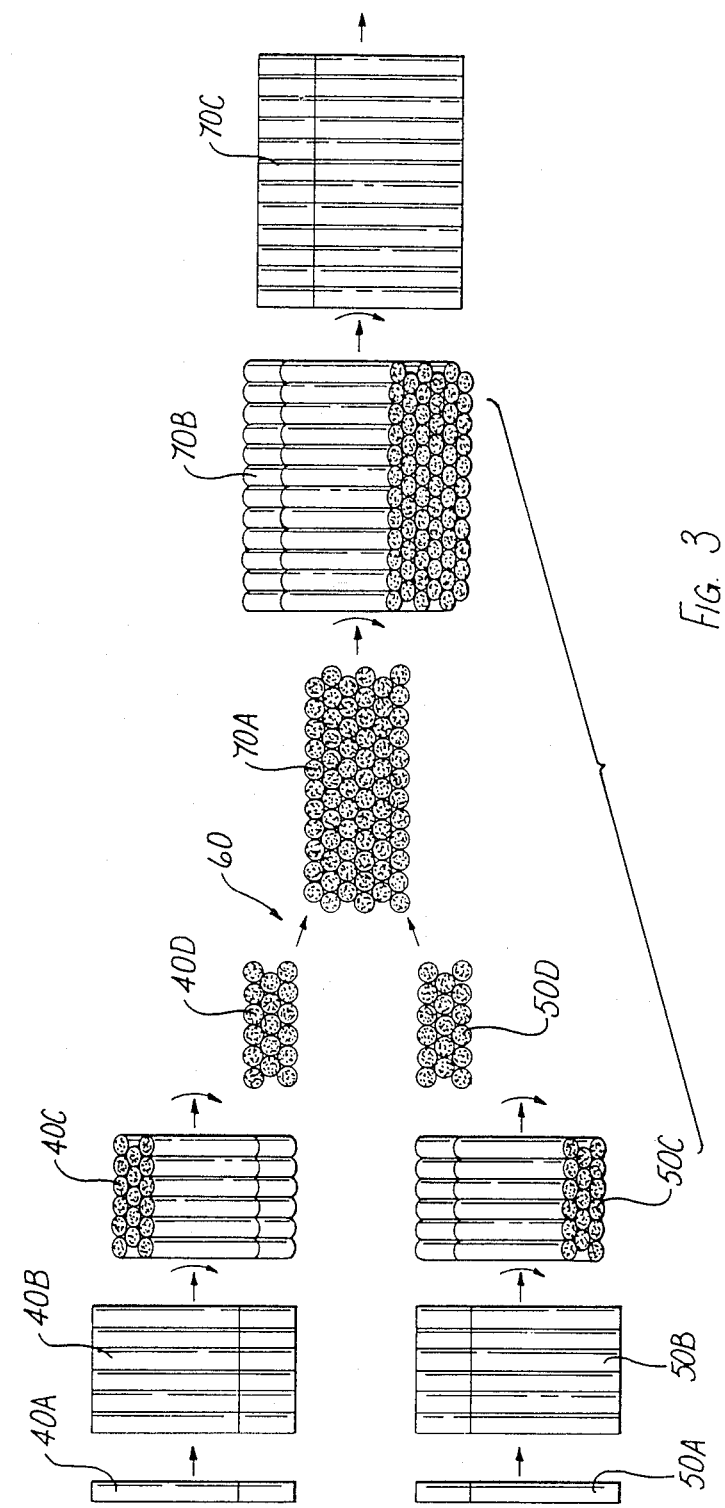
FIG. 3 is a plan showing the paths defined by another conveyor system for cigarettes.

The conveyor system shown in FIGS. 1 and 2 forms part of an arrangement for conveying filter cigarettes away from a filter cigarette making machine such as a Molins PA8. In this machine double length filter cigarettes are produced and sub-divided at their mid-points to form two parallel streams of individual filter cigarettes with their filter tipped ends pointing towards each other. These streams of cigarettes are moved into stack formation by reducing the conveying speed, e.g. as disclosed in British Patent Specification No. 1,453,191, and separately conveyed on parallel endless band conveyors 2, 4 respectively. In order to produce a combined stream with the filter tips of the cigarettes all facing in the same direction the cigarettes on conveyor 2 are passed to a transfer conveyor 6 which transfers the cigarettes to the conveyor 4 and appropriately changes their orientation during transfer.

The path for cigarettes on conveyor 2 terminates in a curved guide 8 and short downdrop 10 which lead to a short horizontal conveyor section comprising laterally spaced bands 12. The guide 8, downdrop 10 and bands 12 define a patch which is set at a small angle to the path on the conveyor 2. The bands 12 lead to and are aligned with the transfer conveyor 6. The bands 12 and conveyor 6 are set at an angle of about 15° to the conveyor 2, so that cigarettes turn laterally through this angle as they pass from the conveyor 2 to the conveyor 6. The guide 8 and downdrop 10 may be set at this angle so that most or all of this change in direction occurs at once, or may be set at a somewhat lesser angle so that the change takes place in stages, or may be twisted so that the change takes place progressively.

At its end adjacent the conveyor 2 the transfer conveyor 6 comprises upper and lower bands 14, 16 passing around rollers 18, 20, respectively. The band 16 passes from the lower roller 20 to an upper roller 22 at the other end of the conveyor 6. Similarly the upper band 14 passes from the upper roller 18 to a lower roller 24 opposite the roller 22. The rollers 22, 24 are driven to move the bands 14, 16 in a direction from the conveyor 2 towards the conveyor 4.

The bands 14, 16 could be separate bands passing around rollers 18, 24 and 20, 22 respectively, or could be interconnected across the upper parts of rollers 18, 12 and across the lower parts of rollers 20, 24 so that the bands 14, 16 in fact constitute a single endless band. Guide means (not shown) could be provided for said return parts of the bands 14, 16. Each of the bands 14, 16 twists through an angle of 180° as it passes the length of the conveyor 6. Fixed laterally spaced guide strips 26, 28 held by support means (not shown) are arranged on each side of the bands 14, 16, respectively and follow a similar twisting path to define with the bands the path for cigarettes on the conveyor 6. The strips 26, 28 could constitute at least part of the guide means for the return parts of the bands 14, 16.

As well as being set at a horizontal angle of about 15° to the conveyors 2, 4 the transfer conveyor 6 is inclined upwardly so that it is above the level of the conveyor 4 at its point of intersection with this conveyor. Thus, a curved guide 30 leads from the end of conveyor 6 into a short downdrop 32 above the conveyor 4. A spoon-type sensor 34 projects into the region below the guide 30. As at the other end of the conveyor 6 the guide 30 and downdrop 32 are set at the same angle as the conveyor 6 but could be inclined slightly or twisted so that the change of angle of cigarettes required on transfer to the conveyor 4 takes place in stages or progressively.

Cigarettes on conveyor 2, typically conveyed in a stack about six cigarettes deep, are passed by the guide 8, downdrop 10 and bands 12 onto the transfer conveyor 6 between the bands 14, 16. The paths of the bands 14, 16, together with the parallel guides 26, 28 turn the cigarettes of the stream through 180° for delivery at the other end of the conveyor 6 into the downdrop 32 and onto the stream on conveyor 4. The movement in the conveyor 6 is such that the cigarettes delivered onto the stream on conveyor 4 have their filter tips at the same ends as the cigarettes already on conveyor 4. The sensor 34 monitors cigarettes in the region above the junction with the conveyor 4 and controls drive of the transfer conveyor 6 accordingly. It may also be necessary to provide sensor means in the vicinity of guide 8 for controlling the conveyor 2 at the input to the conveyor 6.

The bands 14, 16 are flat on the sides which contact the cigarettes but have teeth for driving engagement with at least one of the rollers 18, 20, 22, 24 on the opposite side. The bands 14, 16 are kept under tension, e.g. by resiliently mounting one or more of the rollers 18, 20, 22, 24 or by additional tensioning rollers in the return lengths of the bands, to maintain adequate driving contact and also to keep mild pressure on the cigarettes in the stream on conveyor 6, so that there is little likelihood of cigarettes become relatively displaced by gravity in the center of the stream on the conveyor. Alternatively, pivoted pressure rollers (such as the roller 21 in FIG. 2) could be provided adjacent each of the rollers 18, 20, 22, 24 to press lightly on the bands 14, 16 and maintain them relatively taut. Another way of ensuring control of the stream on conveyor 6 would be to provide low friction guide surfaces for the ends of the cigarettes. These surfaces would follow a twisting path spaced slightly away from the ends of the cigarettes on the conveyor 6.

The bands 14, 16 need not be plain on the side of the cigarettes. Instead they could be formed with ribs or protrusions, substantially as disclosed in British Patent Specification No. 1,453,191, or could be substantially symmetrical with drive teeth on both sides. Alternatively the bands could have a round cross-section. More than one band could be used; for example laterally spaced bands, possibly with a central stationary guide could be used. A conveyor similar to the conveyor 6 could be used otherwise as a conveyor for rod-like articles, particularly as an elevator, substantially as disclosed in said specification, or a vertical controlled downdrop, when it is required to twist rod-like articles as they ascend or descend. In this mode the conveyor may conveniently be used to twist the articles through angles less than 180° normally used for "tip turning".

The conveyor system of FIGS. 3 and 4 forms part of an arrangement for conveying filter cigarettes away from a filter cigarette making machine such as a Molins PA8. As in the arrangement of FIGS. 1 and 2 double length filter cigarettes are produced and subdivided at their mid-points to form two parallel streams of individual filter cigarettes with their filter tipped ends pointing towards each other.

Referring to FIG. 3 two parallel single row streams of cigarettes, generally indicated 40 and 50 respectively, issue from the cigarette making machine and are combined in a merger zone 60 to form a common stream generally indicated 70. The streams 40, 50 are each delivered as single rows 40A, 50A and are moved into stack formation at 40B, 50B, respectively, by reducing the conveying speed. The directions of movement of the streams at 40B, 50B are generally horizontal. Each of the streams 40B, 50B is twisted about a generally horizontal axis, as indicated at 40C, 50C, in opposite directions so that the filter tip ends of the cigarettes in each stream are moved downwards. The cigarettes in each stream are twisted through 90° to form streams 40D, 50D with the cigarettes vertical with their filter tip ends lowermost.

The streams 40D, 50D are combined in the merger zone 60 to form a common stream 70A. As shown at 70B the common stream is twisted about a generally horizontal axis to form a substantially horizontally moving stream 70C in stack formation.

The region adjacent the merger zone 60 is shown in FIG. 4. The stream 40 is conveyed through positions 40B, 40C, and 40D by upper and lower endless twisting drive bands 42. Similarly the stream 50 is conveyed by twisting bands 52. The conveyors comprising bands 42 and 52 may be substantially similar to the conveyor 6 of FIGS. 1 and 2 except that the cigarettes are turned through 90° rather than 180°. In particular the bands 42, 52 may be somewhat narrower than those shown in FIG. 4 and additionally laterally spaced guide elements similar to the guides 26, 28 may be incorporated.

In the merger zone an insert 62 is positioned adjacent the end of the inner conveyors 42, 52. The stream 70 is conveyed away from the junction by parallel drive conveyors 72. Although not so shown in the drawings the conveyors 72 may be twisting conveyors similar to the conveyors 42, 52, so that the stack 70 may be conveyed away from the merger zone and twisted through 90° by the same band conveyors.

In and around the merger zone 60 the filter tip ends of the cigarettes may rest on a polished or other low friction guide surface which supports some or all of their weight. The width of the stack 70 may be no greater than that of each of the stacks 40, 50. For example, the outer bands 42, 52 could be lengthened and/or the angle of convergence of the streams 40, 50 increased, so as to produce a narrower merger zone 60. The streams 40, 50 need not include portions in which the articles are moved in stack formation; for example single row streams 40, 50 could be twisted through 90° and moved to a merger zone at which a stack is formed directly from single row streams of vertical cigarettes. Sensor means may be provided in or adjacent the merger zone 60 to control the speed at which the stack 70 is conveyed away from the merger zone. A suitable sensor means, e.g. as disclosed in British Patent Specification No. 1529961, would comprise an element such as a band responsive to pressure of cigarettes in or adjacent the merger zone 60.

We claim:

1. A conveyor system for rod-like articles, comprising first conveyor means for conveying a multi-layer stream of articles in a direction tranverse to their lengths, transfer conveyor means for conveying a continuous multi-layer stream of articles in stack formation from said first conveyor means, a junction zone to which articles are delivered by said transfer conveyor means, and second conveyor means for moving articles away from the junction zone as a continuous multi-layer stream, wherein the transfer conveyor means comprises spaced conveyors defining opposite sides of a path for said multi-layer stream and arranged to grasp said multi-layer stream therebetween and to twist said stream about a generally horizontal axis substantially parallel to its direction of conveyance, including means providing stationary guides for guiding articles on said path.

2. A conveyor system for rod-like articles, comprising means for conveying a first multi-layer stream of rod-like articles in a direction transverse to the lengths of the articles, means for conveying a second multi-layer stream of rod-like articles in a direction transverse to the lengths of the articles, means for twisting articles in at least one stream about a generally horizontal axis transverse to the lengths of the articles while conveying said articles in a substantially-straight direction while converges towards said other stream, and means for combining said multi-layer streams including a junction zone in which articles from both streams are parallel.

3. A conveyor system for rod-like articles, comprising means for conveying a first continuous multi-layer stream of rod-like articles in a direction transverse to the lengths of the articles, means for conveying a second continuous multi-layer stream of rod-like articles transverse to the lengths of the articles and in a direction parallel to said first stream, transfer conveyor means for receiving articles from said first stream in continuous multi-layer stack formation, a junction between said transfer conveyor means and said conveying means for said second stream, a substantially vertically extending path portion arranged between said transfer conveyor means and said junction for supplying said first stream to said junction, and means for conveying articles from said first and second streams away from said junction in a direction transverse to the lengths of the articles as a continuous multi-layer stream, said transfer conveyor means including endless band conveyor means defining a substantially-straight path for a multiple layer stream of articles, which path is inclined at a small angle to that of the parallel streams and extends diagonally between said respective conveyor means for said first and second streams and twists articles of said first stream on said path through approximately 180 degrees about an axis parallel to said path before reaching said junction.

4. A conveyor system for filter cigarettes comprising conveyor means for conveying first and second substantially parallel multi-layer streams of filter cigarettes in directions transverse to their lengths, the filter tip ends of the cigarettes being on opposite sides of the respective first and second streams relative to their directions of conveyance, and transfer conveyor means for delivering cigarettes from one stream to a junction at which they are combined in a common stream with cigarettes from the other stream, a substantially vertically extending path portion arranged between said transfer conveyor means and said junction for supplying said first stream to said junction, said transfer conveyor means including endless band conveyor means for conveying cigarettes from said one stream in multi-layer stack formation on a substantially-straight path which is inclined at a small angle to said parallel directions, extends diagonally between said first and second streams, and twists about an axis generally parallel to its length, so that said cigarettes from said one stream are delivered by said conveyor means to substantial vertical alignment with said other stream and with their filter tip ends on the same side as articles in said other stream.

5. A conveyor system as claimed in claim 3, wherein said transfer conveyor means and at least one of said first and second conveyor means are arranged so that articles are turned through a small angle about an axis transverse to their lengths on transfer to or from said transfer conveyor means.

6. A conveyor system as claimed in claim 3, wherein said transfer conveyor means further includes means acting resiliently on at least one of said endless band conveyor means to urge said endless band conveyor means together to maintain driving contact with said multi-layer stream and prevent axial displacement of individual rod-like articles from said stream along said path.

7. A conveyor system as claimed in claim 6, wherein the path defined by said transfer conveyor means is inclined to said first and second conveyor means and extends along a substantially-straight diagonal path therebetween.

8. A conveyor system as claimed in claim 7, including a downwardly-extending path portion arranged between said first conveyor means and said transfer conveyor means and a further downwardly-extending path portion arranged between said transfer conveyor means and said second conveyor means.

9. A conveyor system as claimed in claim 8, including sensor means associated with said junction for controlling the conveyance speed of said transfer conveyor means.

10. A conveyor system as claimed in claim 6, wherein said resilient means comprises a pivoted pressure roller mounted to press against said one endless band conveyor means to maintain a degree of tension thereon.

11. A conveyor system as claimed in claim 3, wherein said transfer conveyor means and at least one of said first and second conveyor means are arranged so that articles are turned through a small angle about an axis transverse to their lengths on transfer to or from said transfer conveyor means.

12. A conveyor system for filter cigarettes, comprising means for conveying a first continous multi-layer stream of filter cigarettes in a direction transverse to the lengths of the cigarettes, means for conveying a second continuous multi-layer stream of filter cigarettes transverse to the lengths of the cigarettes and in a direction parallel to said first stream, the filter tip ends of the cigarettes being on opposite sides of the respective first and second streams relative to their directions of conveyance, transfer conveyor means for receiving cigarettes from said first stream in continuous multi-layer stack formation, a junction between said transfer conveyor means and said conveyor means for said second stream, a substantially vertically-extending path portion arranged between said transfer conveyor means and said junction for supplying said first stream to said junction, and means for conveying cigarettes from said first and second streams away from said junction in a direction transverse to the lengths of the cigarettes as a continuous multi-layer stream, said transfer conveyor means including endless band conveyor means defining a substantially straight path for a multiple layer stream of cigarettes, which path is inclined at a small angle to that of the parallel streams and extends diagonally between said respective conveyor means for said first and second streams and twists cigarettes of said first stream on said path through approximately 180 degrees about an axis parallel to said path before reaching said junction.

13. A conveyor system as claimed in claim 12, wherein the transfer conveyor means comprises a single endless band having opposed runs arranged to engage the continuous multi-layer stream on opposite sides thereof.

14. A conveyor system as claimed in claim 12, wherein the transfer conveyor means comprises at least one pair of opposed twisting bands.

15. A conveyor system as claimed in claim 12, including means providing stationary guides for guiding articles on said path.

16. A conveyor system as claimed in claim 12, wherein said transfer conveyor means and at least one of said first and second conveyor means are arranged so that articles are turned through a small angle about an axis transverse to their lengths on transfer to or from said transfer conveyor means.

17. A conveyor system as claimed in claim 12, including sensor means associated with said junction for controlling the conveyance speed of said transfer conveyor means.

18. A conveyor system as claimed in claim 12, wherein said endless band conveyor means of said transfer conveyor means includes spaced conveyors for defining the path for the multiple-layer stream of cigarettes, and wherein means acting resiliently on a return of at least one of said spaced conveyors are provided to urge said spaced conveyors together to maintain driving contact with said multi-layer stream and prevent axial displacement of individual cigarettes from said stream along said path.

19. A conveyor system as claimed in claim 18, wherein said resilient means comprises a pivoted pressure roller mounted to press against one of said spaced conveyors to maintain a degree of tension thereon.

20. A conveyor system as claimed in claim 18, wherein said transfer conveyor means and at least one of said first and second conveyor means are arranged so that articles are turned through a small angle about an axis transverse to their lengths on transfer to or from said transfer conveyor means.

21. A conveyor system for filter cigarettes, comprising means for conveying a first continuous multi-layer stream of filter cigarettes in a direction transverse to the lengths of the articles, means for conveying a second continuous multi-layer stream of filter cigarettes transverse to the lengths of the cigarettes and in a direction parallel to said first stream, the filter tip ends of the cigarettes being on opposite sides of the respective first and second streams relative to their directions of conveyance, transfer conveyor means for receiving cigarettes from said first stream in a continuous multi-layer stack formation, a junction between said transfer conveyor means and said conveying means for said second stream, a substantially vertically-extending path portion arranged between said transfer conveyor means and said junction for supplying said first stream to said junction, and means for conveying cigarettes from said first and second streams from said junction in a direction transverse to the lengths of the cigarettes as a continuous multi-layer stream, said transfer conveyor means including endless band conveyor means defining a substantially-straight path for a multiple layer stream of cigarettes, which path is inclined at a small angle to that of the parallel streams and extends diagonally between said respective conveyor means for said first and second streams and twists cigarettes of said first stream on said path through approximately 180 degrees about an axis parallel to said path before reaching said junction.

22. A conveyor system as claimed in claim 21, wherein the transfer conveyor means comprises a single endless band having opposed runs arranged to engage the continuous multi-layer stream on opposite sides thereof.

23. A conveyor system as claimed in claim 21, wherein the transfer conveyor means comprises at least one pair of opposed twisting bands.

24. A conveyor system as claimed in claims 3, 4, 12 or 20, wherein said transfer conveyor means includes spaced endless bands defining a twisted path having a substantially-horizontal component of direction, means for driving said spaced endless bands to move a multi-layer stream along said twisted path and means for maintaining said spaced endless bands under tension which urges the bands together so as to maintain driving contact between the bands and articles at the sides of the stream and between said articles and articles in the inner portion of the stream, so that during conveyance the formation of the multi-layer stream remains substantially unchanged and axial displacement of individual articles is prevented.

25. A conveyor system as claimed in claim 24, wherein said spaced endless bands engage the articles of said stream intermediate the ends thereof, and further including guide means for guiding the ends of the articles of said stream being conveyed by said transfer conveyor means.

26. A conveyor system as claimed in claim 25, wherein said guide means comprises spaced guide strips disposed on either side of said spaced endless bands forming said transfer conveyor means.

27. A conveyor system for rod-like articles, comprising first conveyor means for conveying a multi-layer stream of articles in a direction transverse to their lengths, transfer conveyor means for conveying a continuous multi-layer stream of articles in stack formation from said first conveyor means, a junction zone to which articles are delivered by said transfer conveyor means, and second conveyor means for moving articles away from the junction zone as a continuous multi-layer stream, wherein the transfer conveyor means comprises spaced conveyors defining opposite sides of a path for said multi-layer stream and arranged to grasp said multi-layer stream therebetween and to twist said stream about a generally horizontal axis substantially parallel to its direction of conveyance.

28. A conveyor system as claimed in claim 27, wherein the transfer conveyor means comprises at least one pair of opposed twisting bands.

29. A conveyor system as claimed in claim 27, wherein said transfer conveyor means includes spaced endless bands twisted along a path through at least one of said first and second transfer zones and having a substantially-horizontal component of direction, means for driving said spaced endless bands to move a multi-layer stream along said path, and means for maintaining said spaced endless bands under tension which urges the bands together so as to maintain driving contact between the bands and articles at the sides of the stream and between said articles and articles in the inner portion of the stream so that during conveyance the formation of the multi-layer stream remains substantially unchanged and axial displacement of individual articles is prevented.

30. A conveyor system for filter cigarettes, comprising means for conveying a first continuous multi-layer stream of filter cigarettes in a direction transverse to the lengths of the cigarettes, means for conveying a second continuous multilayer stream of cigarettes transverse to the lengths of the cigarettes and in a direction generally parallel to the first stream, the filter tip ends of the cigarettes being on opposite sides of the respective first and second streams relative to their directions on conveyance, transfer conveyor means for receiving cigarettes from at least one of said streams in continuous multi-layer stack formation, a junction at a downstream end of said transfer conveyor means, and means for conveying cigarettes from said first and said second streams away from said junction in a direction transverse to the lengths of the cigarettes as a continuous multi-layer stream with the filter tip ends of the cigarettes all on the same side of said stream, said transfer conveyor means including endless band conveyor means having spaced runs defining a substantially straight path for a multi-layer stream of cigarettes, which path twists said stream about an axis substantially parallel to its direction of conveyance, means for driving said endless band conveyor means to convey said stream along said twisted path, and means for maintaining said conveyor means under tension which urges said runs together so as to maintain driving contact on cigarettes at the sides of said stream and to maintain light pressure on articles in the interior of the stream, so that during conveyance the formation of said multi-layer stream remains substantially unchanged and axial displacement of individual articles is prevented, wherein said twisted path includes a portion in which said stream has a generally horizontal component of motion and in which cigarettes in said stream on said path are substantially vertical and held on said path substantially by said tension maintaining means.

31. A conveyor system as claimed in claim 30, where said twisted path extends between said first and second conveyor means and is inclined to said generally parallel direction.

32. A conveyor system as claimed in claim 27, wherein said second conveyor means conveys said articles as a continuous multi-layer stream of said articles in a direction transverse to their lengths, said transfer conveyor means transferring a continuous multi-layer stream of articles from said first conveyor means to said second conveyor means through successive first and second transfer zones in which said stream is twisted about an axis substantially parallel to its direction of conveyance by 90° in each of said first and second transfer zones so that said stream is placed on said second conveyor means with an orientation opposite to that which it had on said first conveyor means, and guide means associated with said transfer conveyor means for supporting at least one end of the articles forming said stream as the stream is being twisted about said axis.

33. A conveyor system as claimed in claim 3, 4, 12 or 21, in which said vertically-extending path portion includes guide means for turning articles through a small angle about a substantially vertical axis to align said articles with articles of said second stream at said junction.

34. A conveyor system as defined in claim 7, wherein the path defined by said transfer conveyor means is inclined upwardly in the direction of article movement with respect to said first and second conveyor means.

35. A conveyor system as claimed in claim 31, wherein said twisted path is inclined upwardly in the direction of article movement with respect to said generally parallel direction.

36. A conveyor system for rod-like articles, comprising first conveyor means for conveying a multi-layer stream of articles in a direction transverse to their lengths, transfer conveyor means for conveying a continuous multi-layer stream of articles in stack formation from said first conveyor means, a junction zone to which articles are delivered by said transfer conveyor means, and second conveyor means for moving articles away from the junction zone as a continuous multi-layer stream, wherein the transfer conveyor means comprises spaced conveyors defining opposite sides of a path for said multi-layer stream and arranged grasp said multi-layer stream and to twist said stream about an axis substantially parallel to its direction of conveyance, wherein the path defined by said transfer conveyor means is inclined to said first and second conveyor means and extends along a substantially-straight diagonal path therebetween.

37. A conveyor system for rod-like articles, comprising first conveyor means for conveying a multi-layer stream of articles in a direction transverse to their lengths, transfer conveyor means for conveying a continuous multi-layer stream of articles in stack formation from said first conveyor means, a junction zone to which articles are delivered by said transfer conveyor mass, and second conveyor means for moving articles away from the junction zone as a continuous multi-layer stream, wherein the transfer conveyor means comprises spaced conveyors defining opposite sides of a path for said multi-layer stream and arranged grasp said multi-layer stream and to twist said stream about an axis substantially parallel to its direction of conveyance, wherein said transfer conveyor means includes spaced endless bands defining a twisted path having a substantially-horizontal component of direction, means for driving said spaced endless bands to move a multi-layer stream along said twisted path and means for maintaining said spaced endless bands under tension which urges the bands together so as to maintain driving contact between the bands and articles at the sides of the stream and between said articles and articles in the inner portion of the stream, so that during conveyance the formation of the multi-layer stream remains substantially unchanged and axial displacement of individual articles is prevented.

* * * * *